US010459609B2

United States Patent
Lee et al.

(10) Patent No.: US 10,459,609 B2
(45) Date of Patent: Oct. 29, 2019

(54) MULTI-STAGE DATA PAGE RENDERING

(71) Applicant: Palantir Technologies Inc., Palo Alto, CA (US)

(72) Inventors: Brian Lee, Sunnyvale, CA (US); Gaspard van Koningsveld, San Jose, CA (US); Kevin Morgan, Palo Alto, CA (US); Michael Kross, Palo Alto, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 16/043,825

(22) Filed: Jul. 24, 2018

(65) Prior Publication Data
US 2019/0302974 A1 Oct. 3, 2019

Related U.S. Application Data

(60) Provisional application No. 62/652,145, filed on Apr. 3, 2018.

(51) Int. Cl.
*G06F 3/0483* (2013.01)
*G06F 3/0484* (2013.01)
*G06F 17/22* (2006.01)

(52) U.S. Cl.
CPC .......... *G06F 3/0483* (2013.01); *G06F 3/0484* (2013.01); *G06F 17/2247* (2013.01)

(58) Field of Classification Search
CPC ................. G06F 3/0484–0484; G06F 17/2247
See application file for complete search history.

(56) References Cited

U.S. PATENT DOCUMENTS

| 6,067,565 A | 5/2000 | Horvitz | |
| 6,182,133 B1 * | 1/2001 | Horvitz | G06F 16/9574 709/223 |
| 8,766,919 B1 * | 7/2014 | Lachwani | G09G 5/00 345/168 |
| 9,565,233 B1 * | 2/2017 | Ozuysal | H04L 67/2842 |
| 9,922,006 B1 * | 3/2018 | Boynes | G06F 17/2247 |

(Continued)

OTHER PUBLICATIONS

"Improving Performance With the Paint Timing API", published to web on Oct. 6, 2017 at https://www.sitepen.com/blog/improving-performance-with-the-paint-timing-api/, retrieved on Jan. 22, 2019 (Year: 2017).*

(Continued)

*Primary Examiner* — Shourjo Dasgupta
(74) *Attorney, Agent, or Firm* — Knobbe, Martens, Olson & Bear, LLP

(57) ABSTRACT

The present disclosure relates to systems and techniques for multi-stage rendering of data pages for display in a data page display window. The present disclosure also relates to rendering data as part of a background instance of a data page renderer. The present disclosure also relates to displaying data requested from a workspace application in a data page window once the requested data is sufficiently rendered as part of a background instance of a data page renderer. The present disclosure also relates to providing a pool of background instances of multiple data page renderers for rendering and pre-rendering data pages for storage and eventual display in a data page window.

19 Claims, 9 Drawing Sheets

(56) References Cited

U.S. PATENT DOCUMENTS

| | | | | |
|---|---|---|---|---|
| 2007/0156845 | A1* | 7/2007 | Devanneaux | H04L 67/02 709/217 |
| 2012/0072498 | A1* | 3/2012 | Carter | H04M 1/72583 709/204 |
| 2012/0284597 | A1* | 11/2012 | Burkard | G06F 17/2235 715/205 |
| 2012/0311429 | A1* | 12/2012 | Decker | G06F 17/2247 715/234 |
| 2012/0324043 | A1* | 12/2012 | Burkard | H04L 67/16 709/217 |
| 2013/0019159 | A1* | 1/2013 | Civelli | H04L 67/2847 715/234 |
| 2013/0235044 | A1* | 9/2013 | Kaleta | G06F 3/0484 345/473 |
| 2014/0071151 | A1* | 3/2014 | Oesterreicher | G06T 15/503 345/589 |
| 2014/0379840 | A1* | 12/2014 | Dao | H04L 67/2847 709/213 |
| 2015/0088968 | A1* | 3/2015 | Wei | H04L 67/10 709/203 |
| 2015/0310126 | A1* | 10/2015 | Steiner | G06F 16/9574 715/204 |
| 2015/0339403 | A1* | 11/2015 | Teeraparpwong | G06F 3/0484 715/234 |
| 2015/0370756 | A1* | 12/2015 | Steeb, III | G06F 16/93 715/201 |
| 2017/0195736 | A1* | 7/2017 | Chai | H04N 21/4821 |
| 2017/0221109 | A1* | 8/2017 | Liu | G06F 16/9574 |
| 2017/0280434 | A1* | 9/2017 | Begeja | H04L 65/4076 |
| 2017/0286392 | A1* | 10/2017 | Wang | G06F 8/427 |
| 2017/0293616 | A1* | 10/2017 | Li | G06F 16/5866 |
| 2018/0032491 | A1* | 2/2018 | Heo | G06F 17/212 |
| 2018/0322688 | A1* | 11/2018 | Ozguner | G06T 15/205 |
| 2019/0005048 | A1* | 1/2019 | Crivello | G06F 17/30058 |

OTHER PUBLICATIONS

Alexander Zlatkov, "How JavaScript Works: The Rendering Engine and Tips to Optimize Its Performance", published to web on Mar. 15, 2018 at https://blog.sessionstack.com/how-javascript-works-the-rendering-engine-and-tips-to-optimize-its-performance-7b95553baeda, retrieved on Jan. 22, 2019 (Year: 2018).*

Jeremy Wagner, "Using the Paint Timing API", published to web on Aug. 21, 2017 at https://css-tricks.com/paint-timing-api/, retrieved on Jan. 22, 2019 (Year: 2017).*

Tali Garsiel and Paul Irish, "How Browsers Work: Behind the Scenes of Modern Web Browsers", published to web on Aug. 5, 2011 at https://www.html5rocks.com/en/tutorials/internals/howbrowserswork/, retrieved on Jan. 22, 2019 (Year: 2011).*

Official Communication for European Patent Application No. 19166630.4 dated Jun. 3, 2019.

* cited by examiner

MULTI-STAGE DATA PAGE RENDERING

TECHNICAL FIELD

The present disclosure relates to systems and techniques for multi-stage data or web page rendering.

BACKGROUND

A data page renderer may display a blank page or a lagging/unresponsive page while rendering data. Such lag/unresponsiveness may be particularly apparent to a user when the data page renderer is embedded in, and used in conjunction with, a workspace to which the data page renderer is non-native.

SUMMARY

The systems, methods, and devices described herein each have several aspects, no single one of which is solely responsible for its desirable attributes. Without limiting the scope of this disclosure, several non-limiting features will now be discussed briefly.

The present disclosure relates to systems and techniques for multi-stage rendering of data pages for display in a data page display window. The present disclosure also relates to rendering data as part of a background instance of a data page renderer. The present disclosure also relates to displaying data requested from a workspace application in a data page window once the requested data is sufficiently rendered as part of a background instance of a data page renderer. The present disclosure also relates to providing a pool of background instances of a data page renderer for rendering and pre-rendering data pages for storage and eventual display in a data page window.

In various embodiments, a system may be configured and/or designed to systematically generate user interface data useable for rendering the various data pages described. The user interface data may be used by the system, and/or another computer system, device, and/or software program (for example, a browser program), to render the data pages. The data pages and interactive user interfaces may be displayed on, for example, electronic displays (including, for example, touch-enabled displays).

Accordingly, in various embodiments, large amounts of data are automatically and strategically rendered in response to user inputs, and the rendered data is efficiently and compactly presented to a user by the system. Thus, in some embodiments, the user interfaces described herein are more efficient as compared to previous user interfaces in which data is not strategically updated and compactly and efficiently presented to the user in response to interactive inputs.

Further, as described herein, the system may be configured and/or designed to generate user interface data useable for rendering the various interactive user interfaces and data pages described. The user interface data may be used by the system, and/or another computer system, device, and/or software program (for example, a browser program), to render the interactive user interfaces and data pages for display. The data pages may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.). The various embodiments of interactive and dynamic user interfaces of the present disclosure are the result of significant research, development, improvement, iteration, and testing. This non-trivial development has resulted in the user interfaces and data page rendering techniques described herein which may provide significant cognitive and ergonomic efficiencies and advantages over previous systems. The interactive and dynamic user interfaces and data page renderers include improved human-computer interactions that may provide reduced mental workloads, improved decision-making, reduced work stress, reduction in errors and/or the like, for a user. For example, user interaction with the interactive user interfaces that employ data page rendering techniques described herein may provide an optimized display of updated content and data and may enable a user to more quickly access, navigate, assess, and utilize such information requested from the interactive user interfaces than with previous systems.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the display data page in a data page renderer. The interactions and presentation of data via the data page renderer described herein may accordingly provide cognitive and ergonomic efficiencies and advantages over previous systems.

Various embodiments of the present disclosure provide improvements to various technologies and technological fields. For example, as described above, existing data page rendering techniques are limited in various ways (e.g., rendering data on screen before the data has been sufficiently rendered based on a request from a user to render the data), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing and rendering of related electronic data, and presentation of the rendered data page updates (such as may be rendered in memory, off-screen) to displayed images at the appropriate time. Such features and others (e.g., data rendering in a background instance) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

Reference will now be made to the accompanying drawings, which illustrate exemplary embodiments of the present disclosure. In the drawings.

DETAILED DESCRIPTION

Figure 1:
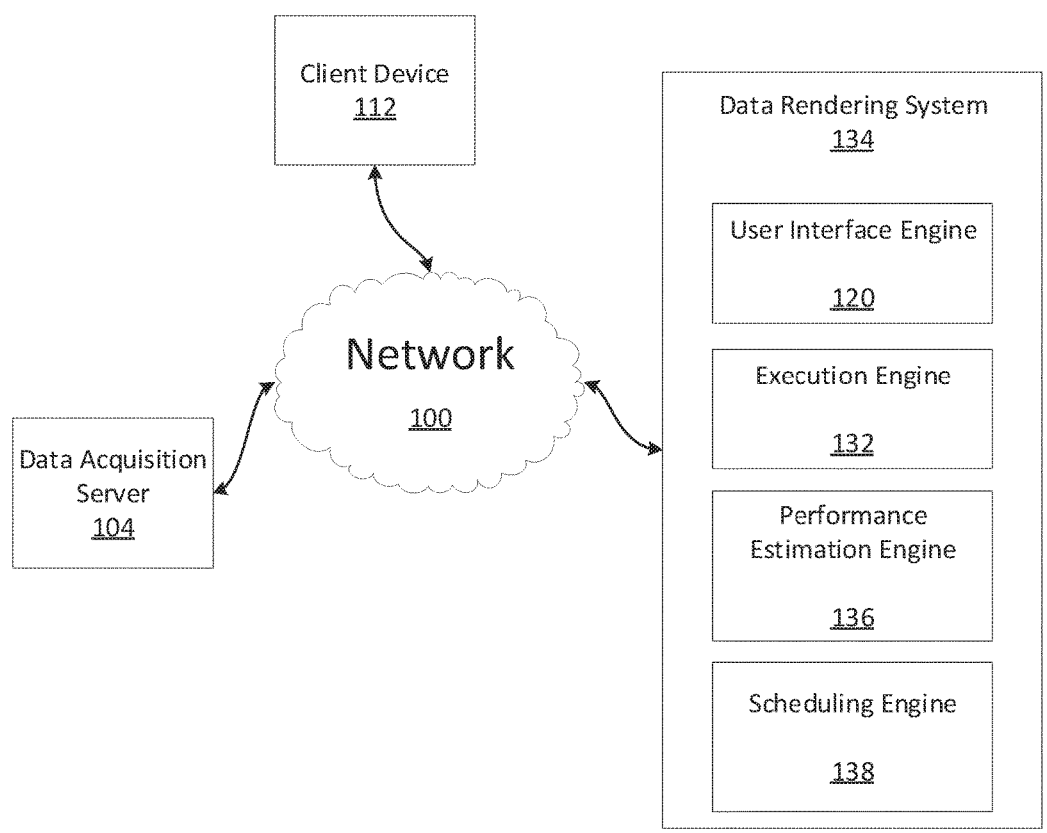
FIG. 1 is a block diagram showing various aspects of a data page rendering system, a user interface system and a network environment in which the data page rendering system and user interface system may be implemented, according to various embodiments of the present disclosure.

Reference will now be made in detail to example embodiments, the examples of which are illustrated in the accompanying drawings. Whenever possible, the same reference numbers will be used throughout the drawings to refer to the same or like parts.

Embodiments of the present disclosure relate to systems, methods, and computer-readable mediums that facilitate rendering, storing and displaying data, content, data pages, web pages, helper applications, or other data items (also referred to herein as data) in a data page renderer.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid-state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data Item or Item: A data container for information representing specific things in the world that have a number of definable properties. For example, a data item can represent an entity such as a physical object, a parcel of land or other real property, a market instrument, a policy or contract, or other noun. Each data item may be associated with a unique identifier that uniquely identifies the data item. The item's attributes (e.g. metadata about the object) may be represented in one or more properties. Attributes may include, for example, a geographic location associated with the item, a value associated with the item, a probability associated with the item, an event associated with the item, and so forth.

Workspace: A software application that may generate user interfaces for interacting with a user, access data from various data sources, process data, communicate data, and so on. A workspace may render data by interpreting user interface code in one or more data formats. A workspace can include an interactive user interface and a display window for displaying content from another application (e.g., from a data page renderer, discussed below), which may separately access various data sources, process data, communicate data, and/or render user interface data for display. In some examples, a workspace comprises a Java workspace.

Data Page Renderer: An application that renders user interface data, such as based on JavaScript. A data page renderer can also interact with a user and/or a workspace. A data page renderer may be a web browser that is configured to render or generate data. In some instances, a data page renderer allows a user to interact with and call data from a server or other computing device via a computing network. For example, a user may interact with or request data using a web browser, such as Chromium. In addition, a data page renderer may be embedded within (or called by) a non-native workspace application (e.g., a Java workspace).

Data Page: Content, such as a user interface, that can be rendered in a data page renderer. For example, a data page can include a web page or other data page (e.g., a document) containing one or more data items.

Off-Screen Rendering: Rendering a data page via a data page renderer in a background process (e.g., an instance of a data page renderer that is not currently outputting rendered data for display) without displaying the data page to a user on a display screen. For example, a data page may be rendered by a data page renderer "off screen" and stored in a local or networked memory device, at least partially, prior to display to a user, such as in a data page window of a workspace application.

Overview

Reference will now be made in detail to example embodiments, the examples of which are illustrated in the accompanying drawings. Whenever possible, the same reference numbers will be used throughout the drawings to refer to the same or like parts.

Disclosed herein are various systems and methods for multi-stage data page rendering. The systems and methods allow a user to select one or more data pages in a workspace (e.g., a Java workspace) to which a data page renderer is non-native without experiencing a lag/unresponsiveness in the rendering of the data page. The systems and methods also allow a pool (i.e., group) of instances of background data page renderers to pre-render multiple data pages according to various rules or algorithms.

For example, when a data page renderer (e.g., a web browser such as Chromium) receives a request to render data (e.g., a web page or other data page), the data page renderer may advantageously render the requested data in a background instance of the data page renderer as part of an off-screen process (e.g., rendered in memory) while allowing, for example, the current data page to remain rendered as the currently rendered and displayed data page within a workspace (e.g., a Java workspace). The background data page renderer may render the requested data page off screen in memory until the data page renderer indicates that the requested data page has been sufficiently rendered and is ready to be displayed to the user. Once the background data page renderer has sufficiently rendered the requested data off screen (e.g., in memory), the background data page renderer may send a control signal to the workspace indicating that the requested data is sufficiently rendered and ready to replace the currently displayed data page. Upon receiving the control signal, the workspace causes the background rendered data page to be displayed in place of the currently rendered data page, such as by activating the background instance of the data page renderer for display within the workspace. As a result, a user will not be met with a blank page while they wait for the requested data page to load. Instead, the user will continue viewing the current data page with current content rendered and displayed while the requested data page is rendered in memory off screen and then displayed once the data is sufficiently rendered.

In some embodiments, a predetermined threshold for when a data page is sufficiently rendered and/or otherwise ready for display in the workspace may be set based on a percentage of data rendered (e.g., 100% rendered or some lesser percentage). For example, the threshold may be set at 80%, such that once the requested data page is at least 80% rendered, the background data page renderer provides a command signal to the workspace to swap out the current data page display with the at least partially rendered data page, such that the requested data page is made available to the user even though it may not be 100% rendered at that particular point in time. Alternatively, the threshold or metric might be based on a timing requirement (e.g., a number of seconds transpired since a request has been received or processed).

In some embodiments, multiple data pages may be rendered in memory at one time. For example, one or more background instances of the data page renderer may render up to a certain number of data pages, such as those that have already been requested by the user or that may soon be requested by the user and store them in memory for quick access and display. Those rendered data pages may then be quickly displayed once a user submits a request to access a specific data page (e.g., selecting a new tab). In some embodiments, a pool (or group) of background data page renderers are available to a workspace to pre-render data pages according to various rules.

In some embodiments, multiple data items (e.g., helper applications included within a separate Chromium browser) may be included within a single web page or data page where the data items also have a latency in being rendered. If a user requests a new data item, however, one or more instances of the data page renderer may render the entire web page or data page off screen, as described above, along with a rendering of the requested data item within the data page. For example, the data page and data item renderer (a "data page" or a "data item" each being considered a "data object") can determine that rendering the data item separately from the data page would require an excessive amount of memory usage and instead may render the data page with the data item using a background instance of the data page renderer and present the data page to a user once the data page is sufficiently rendered regardless of whether the data item is sufficiently rendered. In other words, the user may not see all of the rendered data item as soon as the rendered data page is displayed. Alternatively, a data item could be rendered off screen by a data item renderer such that the current data page is not displayed or available to the user until both the data page and the data item is sufficiently rendered.

Exemplary Multi-Stage Data Rendering System

To provide a framework for the following discussion of specific systems and methods described herein, an example data rendering system 134 will now be described with reference to FIGS. 1 and 2A-D. This description is provided for the purpose of providing an example and is not intended to limit the techniques to the example user interface, the example data rendering system, or the example data rendering system's interacting with a graphical user interface ("GUI") to represent information.

FIG. 1 is a block diagram showing various aspects of a data rendering system 134 and a network environment 100 in which the data rendering system 134 may be implemented, according to various embodiments of the present disclosure. Example data rendering system 134 comprises a user interface engine 120, a performance estimation engine 136, a scheduling engine 138, and an execution engine 132. Data rendering system 134 may be connected via a network 100 to other computing devices, such as a data acquisition server 104 or a client device 112. Data rendering system 134 may, e.g., via execution engine 132, send and receive data to/from client device 112 and/or data acquisition server 104. For example, execution engine 132 may connect to client device 112 through an application programming interface (API) and retrieve or submit data to/from a database maintained on network 100 through appropriate API calls. Similarly, execution engine 132 may receive data from an API or ABI (application binary interface) from data acquisition server 104. In addition, user interface engine 120, execution engine 132, performance estimation engine 136, or scheduling engine 138 may be separate from data rendering system 134 and may comprise their own entities independent of one another.

User interface engine 120 may allow system 134 to interact with the user. User interface engine 120 may generate a user interface, such as a graphical user interface (GUI). The GUI or other interface may be displayed on a client device, such as client device 112. User interface engine 120 may also receive data entered by a user into a client device, such as client device 112, and may store and/or forward it to the other various components of system 134. Client device 112 may, for example, be a user's desktop computer, notebook computer, smartphone, or any other type of computing device and associated software (e.g., a browser capable of rendering output from information provided by user interface engine 120).

Execution engine 132 may provide for execution of a sequence of instructions, such as software instructions. Execution engine 132 may be implemented as, for example, a script interpreter (e.g., a Python or Lua interpreter), a binary loader (e.g., an ELF or PE executable loader), or other execution facilities, such as a just-in-time (JIT) compiler such as a Java Virtual Machine (JVM) or .NET Runtime. In some embodiments, execution engine 132 may be responsible for initiating the rendering of one or more data items by a data renderer.

Performance estimation engine 136 may provide for performance metrics and estimations regarding the system including data rendering system 134. For example, performance estimation engine 136 may be able to determine how much storage allocation (i.e., memory space) is required or is estimated will be used in the rendering of a given data page or a multitude of data pages.

Scheduling engine 138 may provide for scheduling functionality regarding execution commands or timing for actions that are to be executed by data rendering system 134. For example, scheduling engine 138 may include a timer that receives input to start the timer and provides an output signal after a predetermined time has passed based on parameters determined by system algorithms or set by a user via the system interface. In another example, scheduling engine 138 may monitor any data pages rendered or that are being rendered by data rendering system 134. In some instances, scheduling engine 138 may monitor those data pages being rendered as part of a background instance of a data page renderer or pool of background instances of data page renderers. Accordingly, scheduling engine 138 may determine whether data rendered as part of a background instance of a data page renderer is sufficiently rendered (i.e., has achieved a threshold level of percentage rendered). In addition, scheduling engine 138 may determine whether the passage of a set time period has been exceeded with respect to the rendering of a requested data page. In some embodiments, scheduling engine 138 may monitor data that has been pre-rendered in memory in a background instance of a data page renderer or in a pool of background instances of multiple data page renderers. Accordingly, if a user requests data that has been pre-rendered in the background, scheduling engine 138 may provide an output signal to data rendering system 138 indicating that the data is currently rendered in the background and ready for display.

The embodiments of the technology disclosed herein may be performed by additional, fewer, and/or different engines. For example, one or more of the engines of data rendering system 134 may be responsible for executing the functions of any of the other engines of data rendering system 134.

The network environment of FIG. 1 may be used to provide multi-stage data rendering for a user where a user interface engine 120 may be provided to facilitate the presentation of data and the collection of data for rendering and displaying data to a user in a data page window.

Figure 2A:
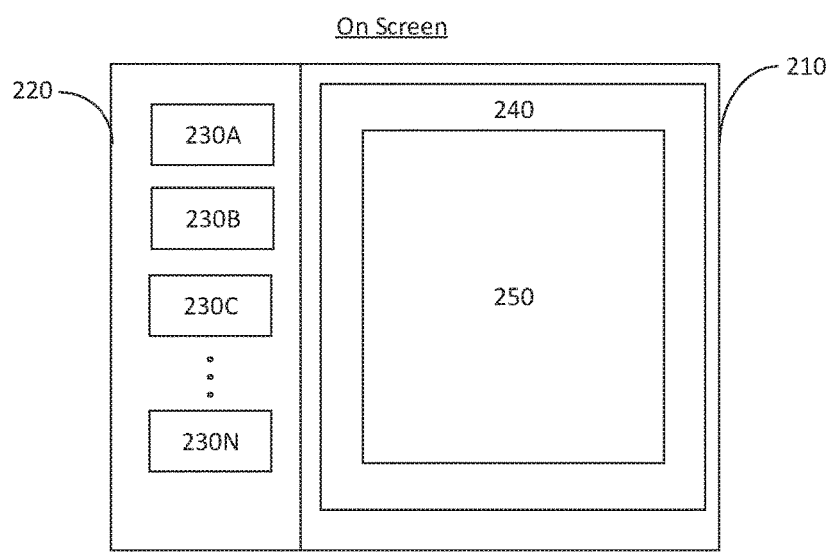
FIGS. 2A-D illustrate sample data page rendering systems showing various aspects of rendering data for display in a data page window, according to various embodiments of the present disclosure.

With reference now to FIG. 2A, a data page window 240 may be included with, or embedded within, a workspace 220. A data page renderer 210 is configured to render data 250 (i.e., content, data page, web page, etc.) for display within the data page window 240. In some embodiments, the user interfaces generated and displayed by the workspace 220 (e.g., 230A-230N) are not configured to communicate directly with the data page renderer 210. For example, in some instances, workspace 220 and data page renderer 210 may be non-native in terms of software programming language and/or architecture. For example, workspace 220 may include Java programming language whereas data page renderer 210 may include JavaScript, HTML5 or another programming language. Thus, a workspace application (e.g., workspace 220) may request data and/or data updates that are rendered and displayed via a different data renderer (e.g., rendered 210) without the ability to monitor the actual rendering progress, user interactions with the rendered content, etc.

In some embodiments, workspace 220 may be a Java workspace. In addition, workspace 215 may include a user interface. The user interface may be a graphical user interface ("GUI") or some other interactive user interface. For example, a user may be able to interact with the user interface of workspace 220 by selecting interactive components, such as 230A-N, within the workspace 220. Interactive component 230A-N may be an icon, soft key, link, tab or some other representation of a data item. For example, in FIG. 2A, a user may be able to select a page link 230A that would send a request to a data page renderer 210 to render data, for example, data page 250, and present the data within window 240. In addition, window 240 and/or workspace 220 may be visible to a user on a user's display screen.

Figure 2B:
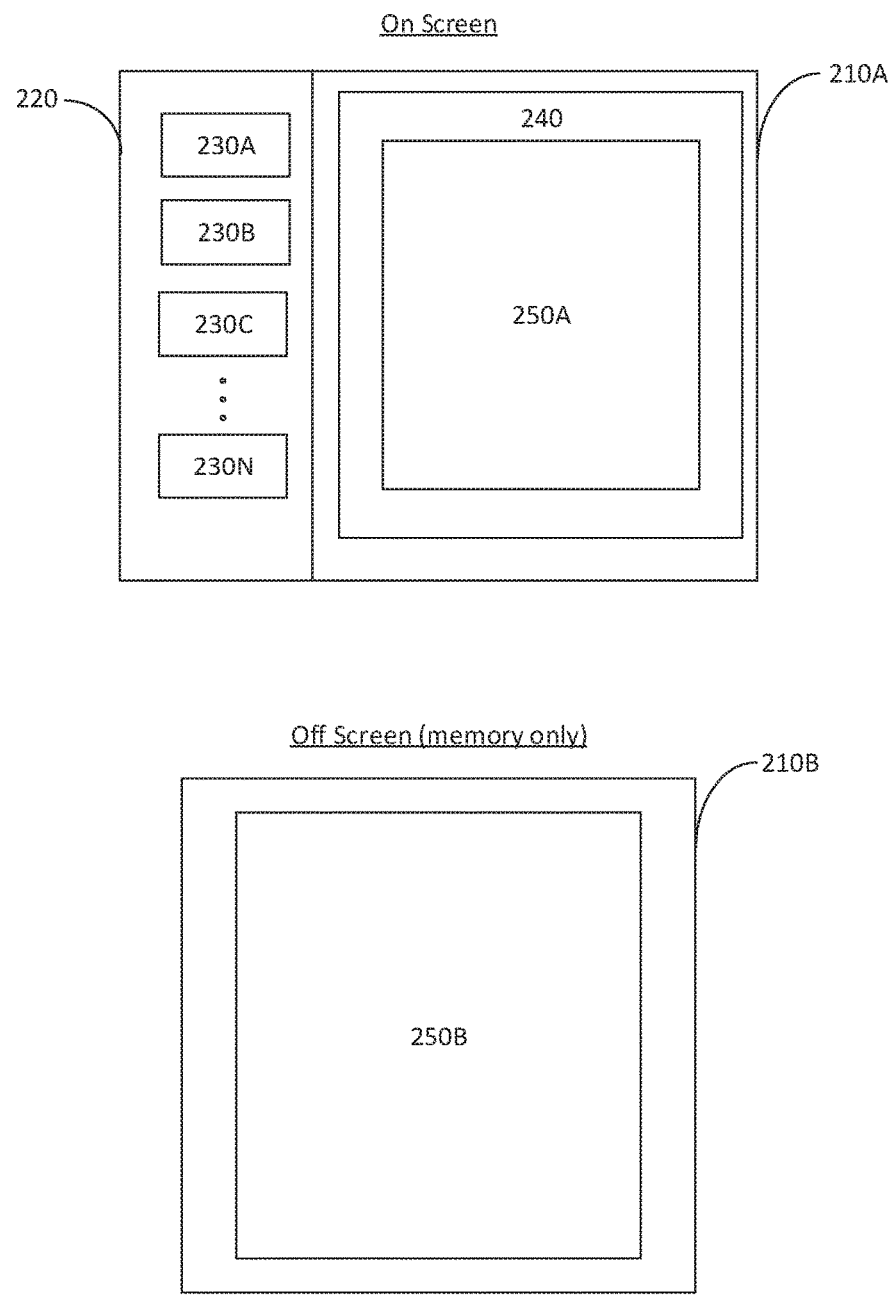

With reference now to FIG. 2B, an example background instance of data renderer 210B is illustrated, in addition to data page renderer 210A and workspace 220. In an embodiment, data page renderer 210A may render and display data page 250A for display in window 240. Accordingly, data page 250A is the current data page rendered and displayed to a user in data page window 240.

In some embodiments, a user may select an interactive component 230B via workspace 220 in order to request new data to be displayed in window 240. For example, the requested data may include a web page, updates to a currently displayed web page, or any other type or format of data page or data item, such as a helper application. Examples of a helper include external viewer programs launched to display data rendered by a data renderer. Selecting interactive component 230B may, in some instances, send a request to a data page renderer 210A or 210B to render the requested data. In some instances, data page renderer 210A may initiate rendering of the requested data to be displayed in window 240 while simultaneously deactivating the currently displayed data 250A, which can result in a blank screen as seen by the viewer.

Alternatively, the request for new data received from workspace 220 may initiate a background instance of a data page renderer 210B for rendering data page 250B as part of a background instance. In some embodiments, user interface engine 120 receives, detects and/or processes the request to render new data and transmits the received request to execution engine 132 for processing the request and rendering the requested data for display or storage. Alternatively, execution engine 132 detects and/or processes the request to render new data. In addition, the request may be transmitted to performance estimation engine 136 and scheduling engine 138 for further processing. In some embodiments, performance estimation engine 136 may determine that the data renderer for rendering the requested data page is non-native to the workspace application. In other words, performance estimation engine 136 may determine that the data page renderer runs on software non-native to the software of the workspace which may tend to hinder communication between the workspace and the data page renderer.

In some embodiments, user interface engine 120 may receive a request to render new data while data page renderer 210A displays a current data page 250A in window 240. User interface engine 120 may transmit the request to execution engine 132, performance estimation engine 136, and/or scheduling engine 138. In such embodiments, execution engine 132 may initiate rendering of the requested data 250B utilizing background data page renderer 210B. Meanwhile, according to the disclosed technology, data page 250A remains currently rendered/visible in window 240. Once the requested data 250B is sufficiently rendered, background data page renderer 210B may signal to data renderer 210A that the requested data is sufficiently rendered and ready to be displayed in window 240. For example, data page 250B may be rendered and stored in a memory device. Upon receiving the signal from data page renderer 210B, workspace application 220 data page renderer 210A may coordinate with data page renderer 210B a switching procedure where the currently displayed data page 250A can be substantially, simultaneously transitioned to requested data 250B (i.e., substantially in real-time). For example, data page renderer 210B may activate data page 250B in the background of window 240 and concurrently send a signal to deactivate data page 250A such that when data page 250A is deactivated, data page 250B is displayed in window 240.

In addition, data renderer 210B may represent a background instance of the data page renderer. For example, as a background instance, a data page 250B rendered within data renderer 210B may be rendered off screen. In some embodiments, the background instance may render the requested data page in memory before signaling to the workspace application 220 that the data is sufficiently rendered for display.

In some embodiments, a predetermined threshold for when a data page is sufficiently rendered and/or otherwise ready for display in the workspace may be set based on a percentage of data rendered (e.g., 100% rendered or some lesser percentage). Accordingly, scheduling engine 138 may monitor the degree to which the requested data is rendered or the amount of time elapsed since the requested data was scheduled to be rendered. For example, the threshold may be set at 80% rendered, such that once the requested data page 250A is at least 80% rendered, background data page renderer 210B may provide a command signal to workspace 220 to swap out the current data page 250A being displayed with the at least partially rendered data page 250B, such that the requested data page 250B is made available to the user even though it may not be 100% rendered at that particular point in time.

Alternatively, the threshold or metric might be based on a timing requirement (e.g., a number of seconds transpired since a request has been received or processed). For example, a timer can start upon initiation of the background instance of data renderer 210B. In addition, a predetermined time may be set by an administrator or another user. For example, the time may be set for 2 seconds, 4.5 seconds, 6 seconds, etc. In the example of a predetermined time being set for 2 seconds, a control signal may be sent to workspace 220 from the background instance of data renderer 210B after 2 seconds of activity in rendering data 250B such that the data page 250A is removed after 2 seconds and data page 250B is rendered, although potentially partially, in its place. For example, data page 250B may be less than 80% rendered at the set time.

In some embodiments, a processing indicator may be displayed within the window while the requested data is being rendered off screen in the background data renderer. For example, a progress bar or a spinning icon may present themselves. In addition, a progress bar may correspond to an amount the data page is rendered in the background instance or to an estimated time before the data will be displayed in the window and take the place of the previously rendered data.

In addition, the system 134 may determine that the amount of memory required to render the second data exceeds an upper or lower predetermined threshold. The amount of memory may also be based on additional pages that are likely to be pre-rendered in a background instance of one or more background instances of a data page renderer. Based on this determination, the system may forego rendering the requested data in the background instance and instead render the requested data within the window. For example, the system may determine that a requested data page requires or is likely to require less memory to render the data page compared to a predetermined lower threshold. In this scenario, the system 134 may determine that rendering the page directly in the window and not as part of a background instance of a data page renderer is desirable since it will likely require less time to render or load the page.

Alternatively, the system 134 may determine that a requested data page requires or is likely to require more data space to render the data compared to a predetermined upper threshold. In some embodiments, performance estimation engine 136 can perform data analytics (e.g., prediction modeling) based on the request received and may provide various instructions to other components of data rendering system 134 (e.g., execution engine 132) based on the data analytics. For example, performance estimation engine 136 may determine that a requested data page will likely require more memory compared to the upper threshold and thus, might adjust for the length of time required to render the page by, for example, displaying the requested page at a lower percentage rendered (e.g., 50% rather than 80%) in order to provide a user with less of a temporal discrepancy in waiting for the requested data to present itself. In addition, the determination may be based on a number of data items (e.g., helpers) or data pages that have been determined should be pre-rendered as described with respect to FIGS. 2D and 4. For example, performance estimation engine 136 may determine that multiple data pages should be rendered by multiple background instances of multiple data page renderers. Accordingly, system 134 may determine that the multitude of data requests will require memory in excess of an upper threshold and thus, may determine that the requested data page should be displayed regardless of whether the other data items or pages are rendered. Alternatively, system 134 may determine that the sum of all data items and pages requested for rendering and pre-rendering does not exceed the threshold and thus, may determine that the system should not display the requested data until all data pages and data items have been sufficiently rendered.

In a non-limiting example, a helper application may be included with a rendered data page in window 240A (not shown). In some instances, a request to render a new helper application in window 240A, but not a new data page, may trigger background renderer 210B to render a new data page, in addition to the requested helper application, in a single background instance of data renderer 210B.

Figure 2C:
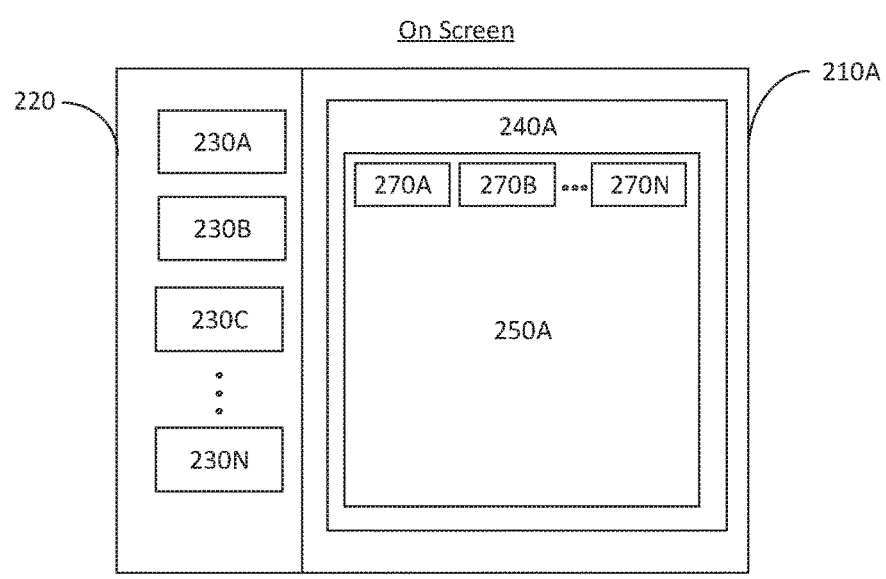

FIG. 2C illustrates another sample embodiment where data page 250B may be rendered by a background instance of data page renderer 210B. In addition, data page 250A currently displayed may include markers, tags, or tabs representing other data pages that may be rendered and displayed in data page window 240A. When the initial request is received to render data page 250A, data rendering system 134 may determine that data page 250A references multiple data items or pages and may advantageously determine that multiple data pages should be rendered for quick access by a user. For example, this determination may be made by performance estimation engine 136. Accordingly, data page renderer may initiate multiple background instances of data page renderers to pre-render additional data pages referenced as part of data page 250B. For example, one or more background instances of data page renderers may render data pages 270A-270N. In some instances, data pages 270A-270N may be tabs that are included with data page 250A.

In addition, data algorithms as part of data rendering system 134 may determine that only a subset of data pages 270A-270N should be rendered in background instances in order to conserve storage space, to satisfy system requirements, or based on system settings or rules predetermined by a network administrator. For example, the system settings may be set to render no more than five data pages under this scenario which would result in only data pages 270A-270E being rendered in this example or some random five (e.g., 270A, 270G, 270H, 270I, and 270K). Alternatively, the system may be based on memory space requirements, as determined by performance estimation engine 136, such that only a certain number of data pages would be rendered as part of a pool of background instances that keeps within the upper limit of the memory space requirement. In addition, the scheduling engine 138 may monitor the data rendered within the pool. Accordingly, user interface engine 120, upon receiving a request to render data, may transmit the request to scheduling engine 138, among the engines of data rendering system 134, to determine whether the data has been pre-rendered in a background instance of a data page renderer.

In some embodiments, the same transition may be employed in this scenario as discussed with reference to FIG. 2B such that a background instance of a rendered data page may take the place of current data page 250A substantially simultaneously (i.e., in real-time or near real-time) when the data page is sufficiently rendered following a request from a user via workspace 220.

Figure 2D:
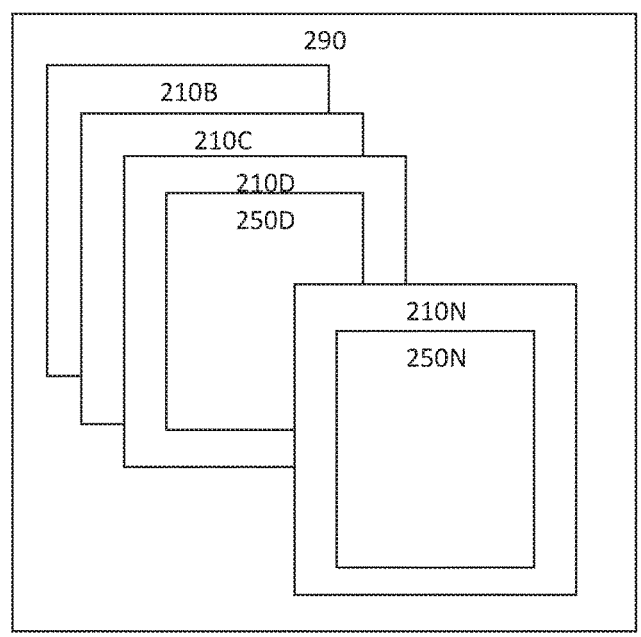

FIG. 2D illustrates an example background rendering scheme where a pool of instances 290 may comprise multiple data page renderers 210B-210N, each with a data page 250B-250N rendered in memory. In some embodiments, the same transition may be employed in this scenario as discussed with reference to FIG. 2B such that a background instance of a rendered data page may take the place of current data page 250A substantially simultaneously when the data page is sufficiently rendered following a request from a user via workspace 220 and a command signal from scheduling engine 138 signaling that the data page is sufficiently rendered. It is noted that the data page may have been pre-rendered in a background instance of a data page renderer according to instructions received from performance estimation engine 136. In such embodiments, the scheduling engine 138 may send the command signal immediately upon receiving the request based on a determination that the requested data is pre-rendered.

Figure 3:
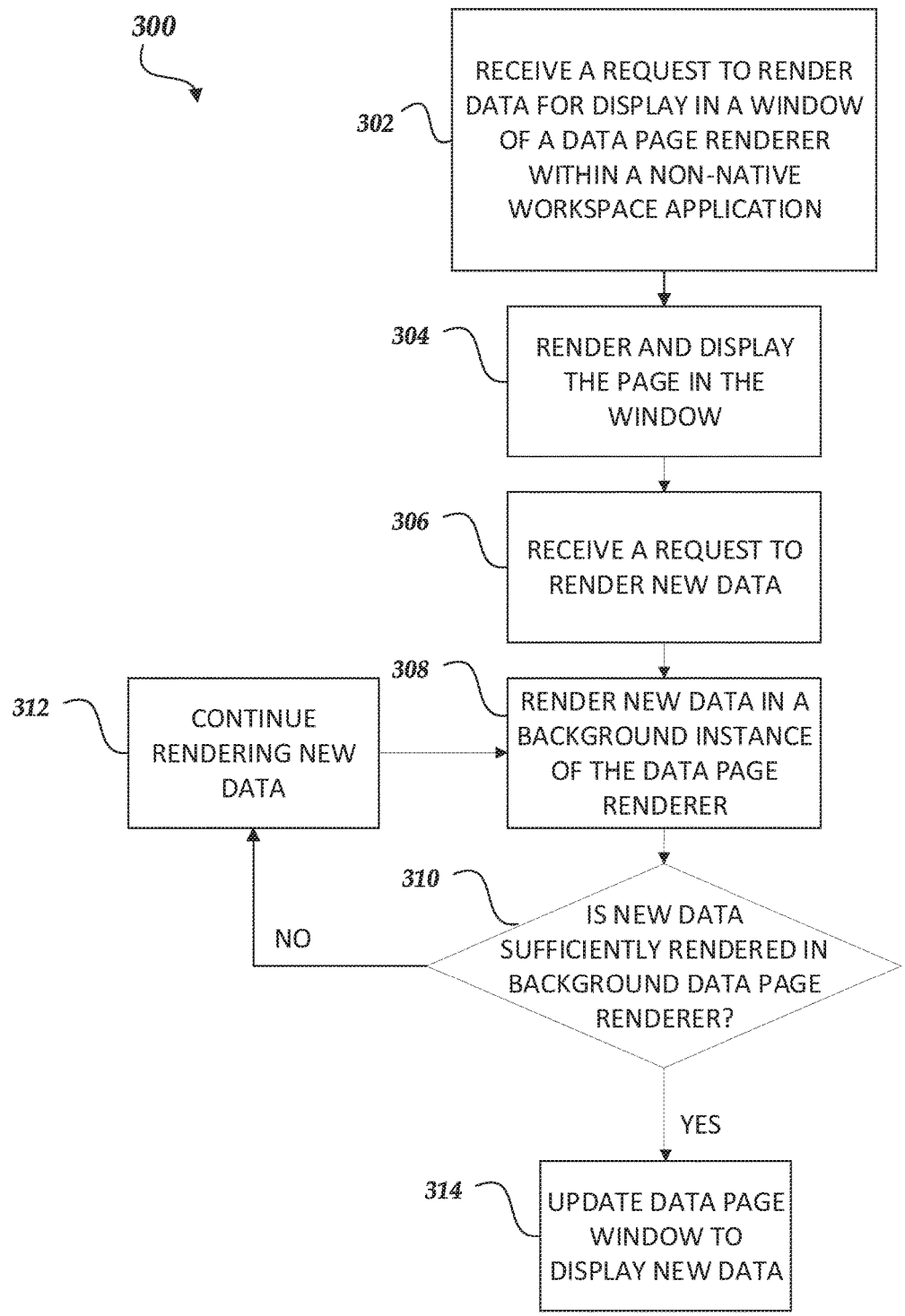
FIG. 3 illustrates a flowchart for rendering data for display in a window, according to certain embodiments.

FIG. 3 illustrates an example method of rendering data for display in a window. For purposes of illustrating a clear example, the approach of FIG. 3 is described herein with reference to FIGS. 1 and 2A-2D. However, the approach of FIG. 3 may be implemented using other mechanisms for performing the functional blocks of FIG. 3, and the particular systems of FIGS. 1 and 2A-2D are not required.

In block 302, data rendering system 134 receives a request from a workspace to render data for display in a data window. The request may be sent as a result of a user selecting a component of an interactive user interface that initiates the request for new data or content. In addition, the data page renderer may be non-native to the workspace application.

In block 304, data rendering system 134 may render the requested data page 250A and display data page 250A in data page window 240. In block 306, a second request is received to render new data. For example, the new data may be data page 250B. In block 308, the new data page may be rendered in a background instance of data renderer 210B. At block 310, a determination is made on whether the new data has been sufficiently rendered for display. If the new data (e.g., data page 250B) is sufficiently rendered for display as determined by any number of metrics described herein, for example, then at block 314, the window may update to display the new data in place of the previously displayed data. In some embodiments, the background data renderer may send a control signal to a workspace when the data renderer has determined that the requested data is sufficiently rendered for display or approaching a threshold indicating that the data page is ready to be displayed. For example, new data page may take the place of the previously rendered data page 250A substantially simultaneously. If the new data is not sufficiently rendered, at block 312, the background data page renderer may continue rendering the requested new data until it is sufficiently rendered.

Figure 4:
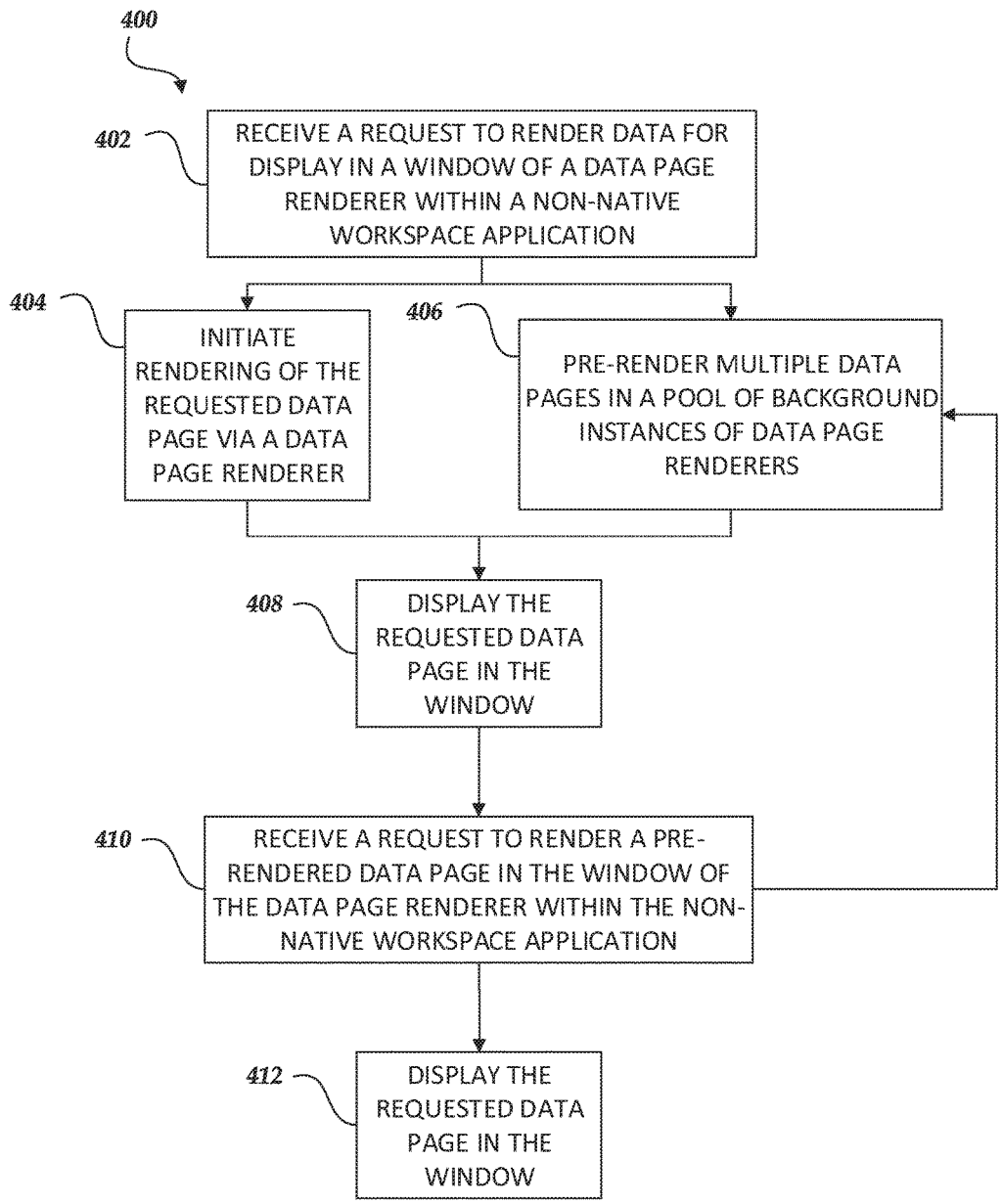
FIG. 4 illustrates a flowchart for rendering and pre-rendering data, according to certain embodiments.

FIG. 4 illustrates a method of rendering and pre-rendering data, such as may have been defined using the process of FIG. 4. For purposes of illustrating a clear example, the approach of FIG. 4 is described herein with reference to FIGS. 1, 2A and 2B. However, the approach of FIG. 4 may be implemented using other mechanisms for performing the functional blocks of FIG. 4, and the particular systems of FIGS. 1, 2A and 2B are not required.

In block 402, data rendering system 134 receives a request from, for example, a workspace to render data for display in a data window. The request may be sent as a result of a user selecting a component of an interactive user interface that initiates the request for new data or content. In addition, the data page renderer may be non-native to the workspace application.

In block 404, a background data page renderer may initiate rendering of the requested data page in a background instance. Substantially in parallel at block 406, a pool of background instances of data page renderers may pre-render multiple data pages that are associated with the requested data.

In block 408, data rendering system 134 may render the requested data page 250A and display data page 250A in data page window 240. In block 406, a second request is received to render new data. For example, the new data may be data page 250B.

In block 410, a second request may be received from a user to render a page that was pre-rendered at block 406. Thus, at block 412, the data page will already be rendered and ready for display. Thus, the data page will be displayed. Alternatively, the workspace may wait until a control signal is received for the data page to be received at block 412 before displaying the requested data page. Lastly, the request to render a pre-rendered data page may trigger multiple new data pages to be rendered in a pool of background data page rendering instances that are associated with the requested data page.

The approach of FIGS. 3 and 4 may be implemented using other mechanisms for creating and specifying the values and elements identified for rendering data. In addition, a particular GUI or interactive user interface is not required.

Figure 5:
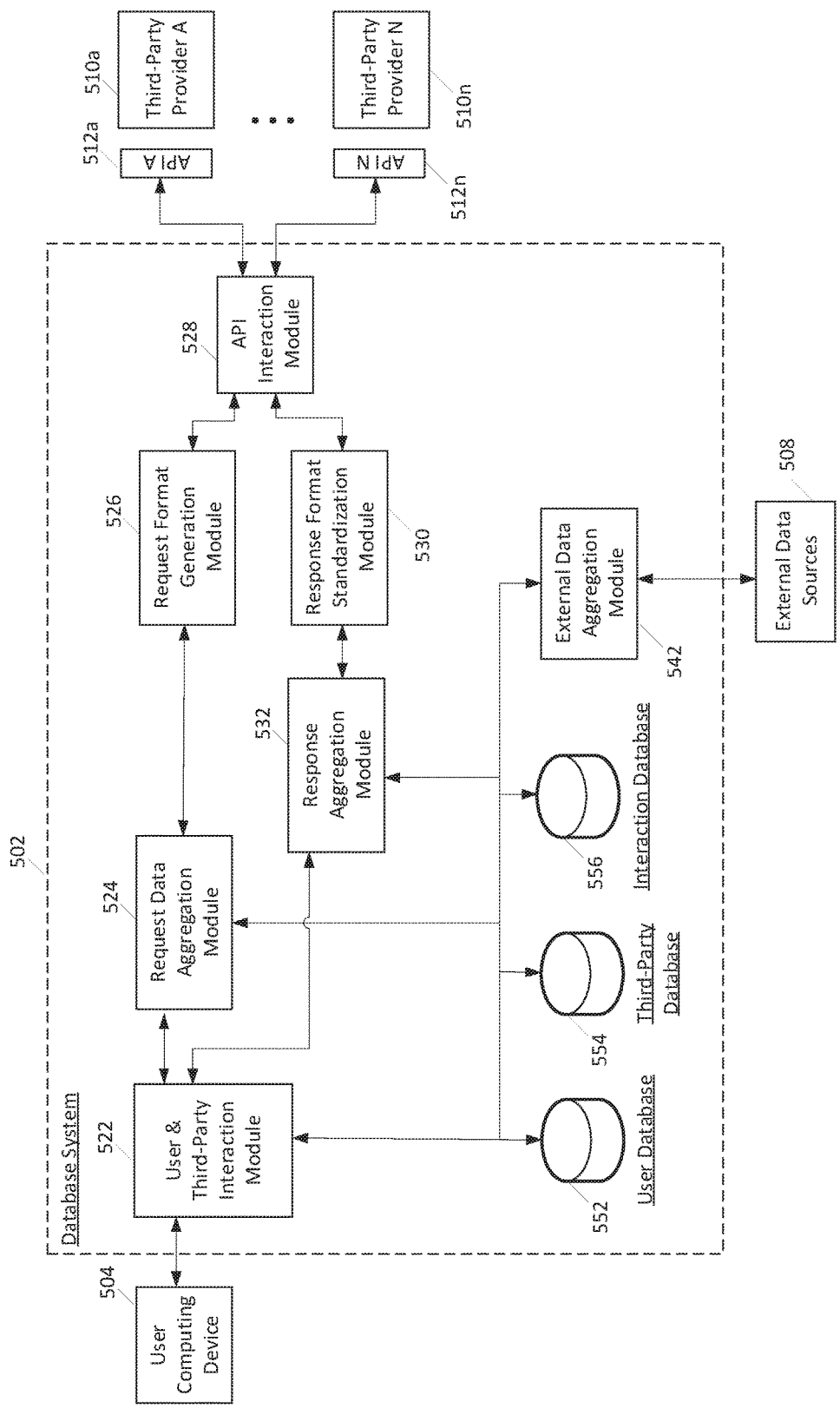
FIG. 5 is a block diagram showing various aspects of a database system and network environment in which the database system may be implemented, according to various embodiments of the present disclosure.

As indicated in FIG. 5, in an implementation the database system 502 (or one or more aspects of the database system 502) may comprise, or be implemented in, a "virtual computing environment". As used herein, the term "virtual computing environment" should be construed broadly to include, for example, computer readable program instructions executed by one or more processors (e.g., as described below in the example of FIG. 6) to implement one or more aspects of the modules and/or functionality described herein. For example, a request received from the user computing device 504 may be understood as modifying operation of the virtual computing environment to cause the request data aggregation module 524 to gather data associated with the request, the request format generation module 526 to generate third-party requests with the appropriate formats and information, and the API interaction module 528 to transmit those requests to one or more APIs.

Additionally, user and third-party interaction module 522 may include the user interface described with respect to FIGS. 1 and 2A-2D. Accordingly, interaction module 522 may be configured to access APIs stored in, for example, a user database 552, a third-party database 554, an interaction database 556, or any other external data source or database, and interact with users in requesting data page rendering. Interaction module 522 may also be configured to access APIs stored as part of a cloud network (not shown).

Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the request data aggregation module 524 and/or responses received and analyzed by the response aggregation module 532. Initial operation of the virtual computing environment may be understood as an establishment of the virtual computing environment. In some implementations the virtual computing environment may comprise one or more virtual machines or other emulations of a computing system. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the database system 502 as a virtual computing environment may advantageously enable executing different aspects or modules of the system on different computing devices or processors, which may increase the scalability of the system. Implementing one or more aspects of the database system 502 as a virtual computing environment may further advantageously enable sandboxing various aspects, data, or modules of the system from one another, which may increase security of the system by preventing, for example, malicious intrusion into the system from spreading. Implementing one or more aspects of the database system 502 as a virtual computing environment may further advantageously enable parallel execution of various aspects or modules of the system, which may increase the scalability of the system. Implementing one or more aspects of the database system 502 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

In various embodiments, outgoing requests and/or incoming responses may be communicated in any suitable formats. For example, XML, JSON, and/or any other suitable formats may be used for API requests and responses. In some implementations, the system may advantageously, as described above, convert data from one format to another (e.g., based on templates) to enable communications with multiple third-parties and APIs. Such implementations may be particularly advantageous as the system is enabled to scale and communicate via ever more disparate API's over time, and be easily adapted to changes in existing API's as needed.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid-state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid-state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid-state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
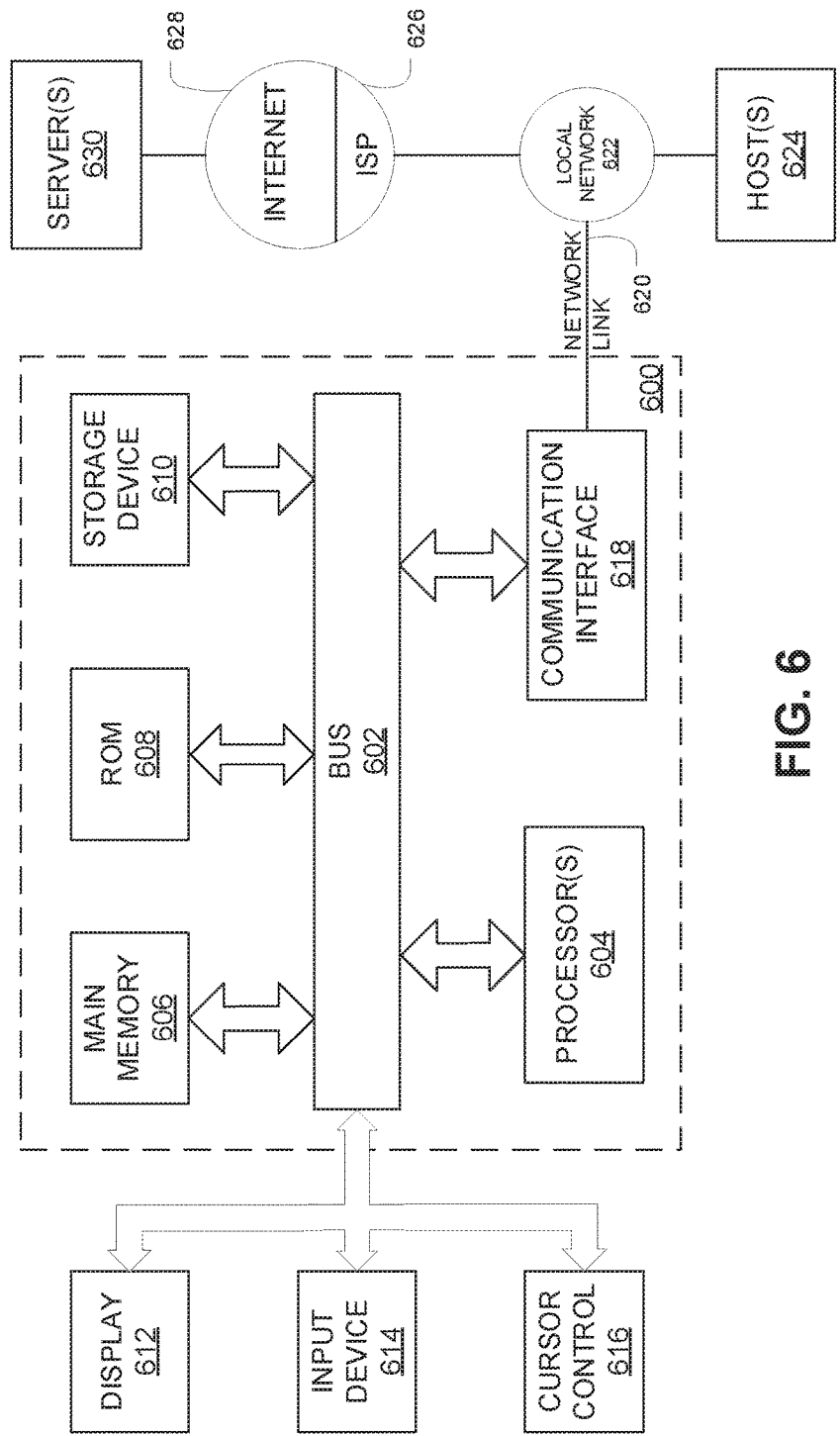
FIG. 6 illustrates a computer system with which certain methods discussed herein may be implemented.

For example, FIG. 6 is a block diagram that illustrates a computer system 600 upon which various embodiments may be implemented. Computer system 600 includes a bus 602 or other communication mechanism for communicating information, and a hardware processor, or multiple processors, 604 coupled with bus 602 for processing information. Hardware processor(s) 604 may be, for example, one or more general purpose microprocessors.

Computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions. In some embodiments, the background instances of data renderers may be implemented within computer system 600 such that data is rendered in memory before being displayed on display 612 once the data is sufficiently rendered.

Computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

Computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 600 may include a user interface module to implement a GUI that may be stored in a mass storage device as computer executable program instructions that are executed by the computing device(s). Computer system 600 may further, as described below, implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more computer readable program instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

Various forms of computer readable storage media may be involved in carrying one or more sequences of one or more computer readable program instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicate with a WAN). Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world-wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" or "near" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general-purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computing system comprising:
   a computer readable storage medium having program instructions embodied therewith; and one or more computer hardware processors configured to execute the program instructions to cause the computing system to:
receive, by a workspace application, a first user interface input requesting rendering of a first data page for display in a data page window;
render the first data page with a data page renderer;
display the rendered first data page within the data page window;
receive a second user interface input requesting rendering of a second data page for display in the data page window;
render the second data page with a second data page renderer;
receive a control signal from the second data page renderer indicating that at least a threshold percentage of the second data page is rendered; and
in response to the workspace application receiving the control signal, initiate an update of the data page window to display the second data page in place of the first data page.

2. The computing system of claim 1, wherein the program instructions further cause the computing system to store the second data page in a memory device until the control signal is received by the workspace application.

3. The computing system of claim 1, wherein the second data page renderer comprises a second instance of the data page renderer.

4. The computing system of claim 1, wherein a plurality of instances of the data page renderer are selectable by the workspace application for pre-rendering data pages.

5. The computing system of claim 1, wherein the program instructions further cause the computing system to:
determine an amount of memory required to render the second data page; and
render the second data page with the second data page renderer based at least in part on the amount of memory required to render the second data page.

6. The computing system of claim 1, wherein the first data page comprises one of a web page, data item, or a helper application.

7. The computing system of claim 1, wherein the data page renderer comprises a web browser.

8. The computing system of claim 1, wherein the program instructions further cause the computing system to display a processing indicator in the data page window while the second data page is being rendered.

9. The computing system of claim 8, wherein displaying the second data page in place of the first data page occurs near real-time relative to when the update of the date page window is initiated.

10. The computing system of claim 1, wherein one or more additional data pages are rendered by one or more other instances of the data page renderer based at least in part on the second user interface input.

11. The computing system of claim 1, wherein the data page window is rendered by the workspace application.

12. A method comprising:
receiving, by a workspace application, a first user interface input requesting rendering of a first data page for display in a data page window;
rendering the first data page with a data page renderer;
displaying the rendered first data page within the data page window;
receiving a second user interface input requesting rendering of a second data page to be displayed in the data page window;
rendering the second data page with a second data page renderer;
receiving a control signal from the second data page renderer indicating that at least in part a threshold percentage of the second data page is rendered; and
in response to the workspace application receiving the control signal, initiating an update of the data page window to display the second data page in place of the first data page.

13. The method of claim 12, further comprising:
storing the second data page in a memory device until the control signal is received by the workspace application.

14. The method of claim 12, wherein the second data page renderer comprises a second instance of the data page renderer.

15. The method of claim 12, wherein a pool of instances of a plurality of data page renderers are selectable by the workspace application for pre-rendering data pages.

16. The method of claim 12, further comprising:
determining an amount of memory required to render the second data page; and
rendering the second data page with the second data page renderer based at least in part on the amount of memory required to render the second data page.

17. The method of claim 12, wherein displaying the second data page in place of the first data page occurs near real-time relative to when the data page window is updating.

18. The method of claim 12, wherein one or more additional data pages are rendered by one or more other instances of the second data page renderer based at least in part on the second user interface input.

19. A non-transitory computer readable medium having software instructions stored thereon, the software instructions executable by a hardware computer processor to cause a computing system to perform operations comprising:
receiving, by a workspace application, a first user interface input requesting rendering of a first data page for display in a data page window;
rendering the first data page with a data page renderer;
displaying the rendered first data page within the data page window;
receiving a second user interface input requesting rendering of a second data page for display in the data page window;
rendering the second data page with a second data page renderer;
receiving a control signal from the second data page renderer indicating that at least a threshold percentage of the second data page is rendered; and
in response to the workspace application receiving the control signal, initiating an update of the data page window to display the second data page in place of the first data page.

* * * * *